(12) United States Patent
Bao

(10) Patent No.: US 7,064,768 B1
(45) Date of Patent: Jun. 20, 2006

(54) BAD PIXEL CORRECTION WHILE PRESERVING FEATURES

(75) Inventor: Yiliang Bao, Redondo Beach, CA (US)

(73) Assignee: ESS Technology, Inc., Fremont, CA (US)

(*) Notice: Subject to any disclaimer, the term of this patent is extended or adjusted under 35 U.S.C. 154(b) by 136 days.

(21) Appl. No.: 10/102,410

(22) Filed: Mar. 20, 2002

(51) Int. Cl.
G09G 5/02 (2006.01)
G06K 9/00 (2006.01)
H04N 9/64 (2006.01)
G09K 9/42 (2006.01)

(52) U.S. Cl. .............. 345/589; 345/618; 345/698; 382/162; 382/254; 348/246

(58) Field of Classification Search .......... 382/149, 382/162–167, 218, 168, 172, 254, 274, 276; 348/182, 189, 272, 246, 129, 134, 245, 247; 345/589, 593, 597, 612, 618, 698, 696
See application file for complete search history.

(56) References Cited

U.S. PATENT DOCUMENTS

| | | | | |
|---|---|---|---|---|
| 5,432,863 A | * | 7/1995 | Benati et al. | 382/167 |
| 5,764,209 A | * | 6/1998 | Hawthorne et al. | 345/87 |
| 6,035,072 A | * | 3/2000 | Read | 382/275 |
| 6,038,031 A | * | 3/2000 | Murphy | 382/254 |
| 6,498,831 B1 | * | 12/2002 | Granfors et al. | 378/98.8 |
| 6,735,341 B1 | * | 5/2004 | Horie et al. | 382/239 |
| 2001/0020949 A1 | * | 9/2001 | Gong et al. | 345/593 |

* cited by examiner

Primary Examiner—Kee M. Tung
Assistant Examiner—Wesner Sajous
(74) Attorney, Agent, or Firm—Farjami & Farjami LLP (57) ABSTRACT

A pixel correction system is provided. The pixel correction system includes a dynamic range detection system that receives test pixel data and adjacent pixel data and determines whether the test pixel data is within minimum pixel characteristic data and maximum pixel characteristic data of the adjacent pixel data. For example, if the pixel characteristic data is intensity, the dynamic range detection system detects bad pixels by identifying those pixels having an intensity value that is greater than the maximum intensity value of an adjacent pixel, or less than the minimum intensity value of an adjacent pixel. A dynamic range correction system coupled to the dynamic range detection system adjusts the test pixel data if the test pixel data is not within the maximum pixel characteristic data and the minimum pixel characteristic data, such as by setting the test pixel data equal to the maximum pixel characteristic data if the test pixel data is greater than the maximum pixel characteristic data, and by setting the test pixel data equal to the minimum pixel characteristic data if the test pixel data is less than the minimum pixel characteristic data.

20 Claims, 9 Drawing Sheets

BAD PIXEL CORRECTION WHILE PRESERVING FEATURES

BACKGROUND OF THE INVENTION

1. Field of the Invention

The invention relates to image processing and, more particularly, to bad pixel detection and correction within digital image processing that preserves features within the image.

2. Related Art

Conventional bad pixel detection and correction systems often employ multi-stage median filtering. The multi-stage median filtering is performed as shown below. For the 3×3 pixel array:

a0, a1, a2
a3, A, a4
a5, a6, a7 where a0, a1, a2, a3, a4, a5, a6, and a7 are the neighboring pixels, the multi-stage median filtering process is performed as follows:

H=median (a3, A, a4)
V=median (a1, A, a6)
O=median (H, A, V)
SE=median (a0, A, a7)
NE=median (a5, A, a2)
D=median (SE, A, NE)
A'=median (O, A, D)

One of the deficiencies of this conventional method of bad pixel correction is that three operations are needed to determine each median, and a total of twenty-one operations are performed for each pixel. The multi-stage median filtering process also must be performed on every pixel, instead of just those that are actually bad. Another conventional method for correcting bad pixels is normal median filtering, but this method must also be performed on every pixel, and can undesirably smooth detail features on the image.

SUMMARY OF THE INVENTION

In accordance with the present invention, a system and method for bad pixel detection and correction are provided that overcome known problems with systems and methods for bad pixel detection and correction.

In particular, a system and method for bad pixel detection and correction are provided that use dynamic range thresholds to determine whether a pixel is bad and to determine the correction factor.

In accordance with an exemplary embodiment of the present invention, a pixel correction system is provided. The pixel correction system includes a dynamic range detection system that receives test pixel data and adjacent pixel data and determines whether the test pixel data is within minimum pixel characteristic data and maximum pixel characteristic data of the adjacent pixel data. For example, if the pixel characteristic data is intensity, the dynamic range detection system detects bad pixels by identifying those pixels having an intensity value that is greater than the maximum intensity value of an adjacent pixel plus a threshold value, or less than the minimum intensity value of an adjacent pixel minus a threshold value. A dynamic range correction system coupled to the dynamic range detection system adjusts the test pixel data if the test pixel data is not within the maximum pixel characteristic data and the minimum pixel characteristic data, such as by setting the test pixel data equal to the maximum pixel characteristic data if the test pixel data is greater than the maximum pixel characteristic data, and by setting the test pixel data equal to the minimum pixel characteristic data if the test pixel data is less than the minimum pixel characteristic data.

The present invention provides many important technical advantages. One important technical advantage of the present invention is a system and method for bad pixel detection and correction that use dynamic range thresholds to determine whether a pixel is bad. If the pixel is bad, then the pixel characteristic data is replaced with characteristic data for one of the adjacent pixels. The thresholds for the present invention can be adjusted to accommodate detail levels so as to provide bad pixel detection and correction that does not impair detail resolution.

Other systems, methods, features and advantages of the invention will be apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE SEVERAL VIEWS OF THE DRAWINGS

The components in the figures are not necessarily to scale, emphasis instead being placed upon illustrating the principles of the invention. In the figures, like reference numerals designate corresponding parts throughout the different views.

A better understanding of the present invention can be obtained when the following detailed description of various exemplary embodiments is considered in conjunction with the following drawings.

DETAILED DESCRIPTION OF THE INVENTION

Figure 1:
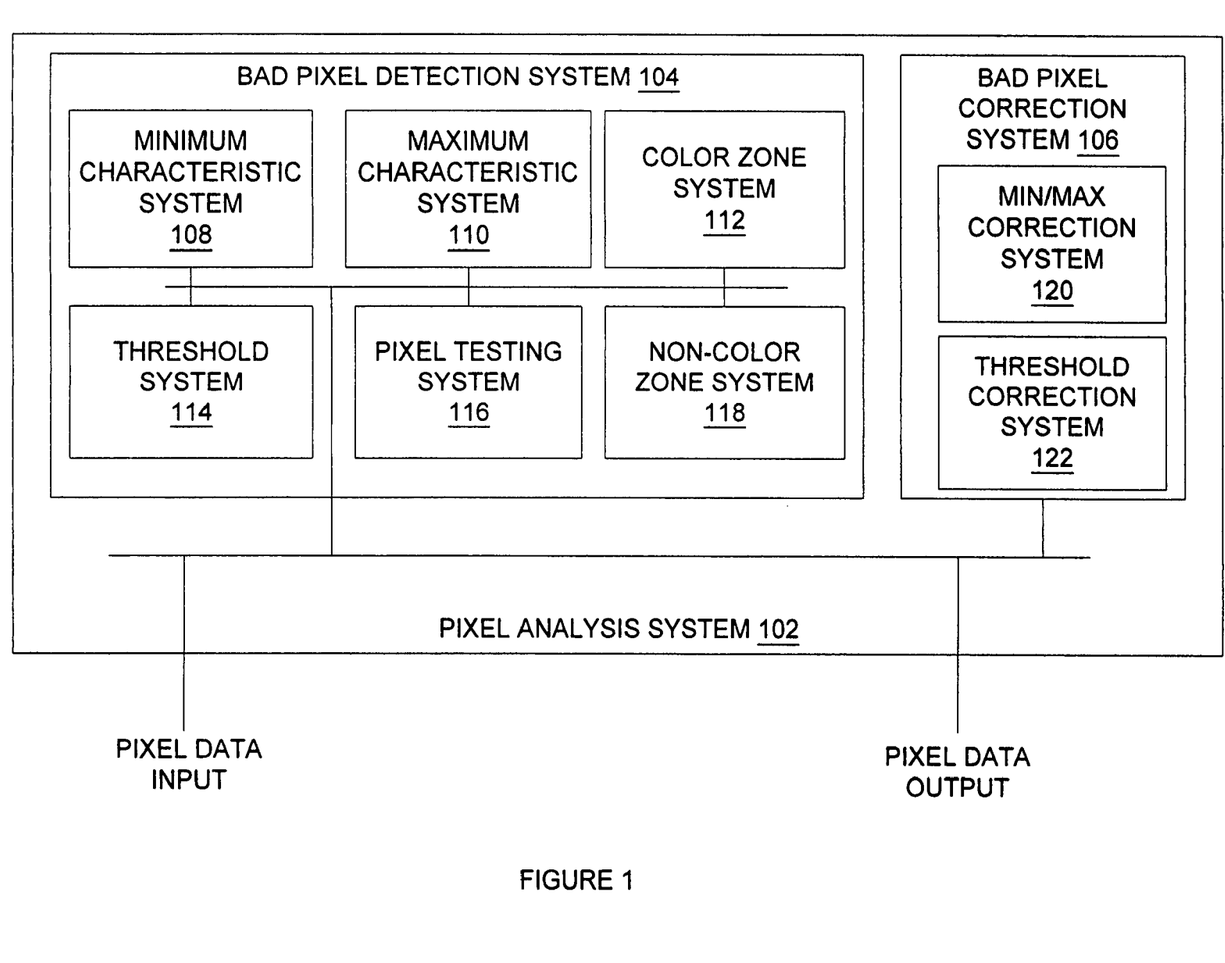
FIG. 1 is diagram of a system for detecting and correcting bad pixels in accordance with an exemplary embodiment of the present invention.

FIG. 1 is diagram of a system 100 for detecting and correcting bad pixels in accordance with an exemplary embodiment of the present invention. System 100 can use the characteristic data, such as intensity or brightness, for as few as two pixels adjacent to a test pixel to determine whether the test pixel is a bad pixel, and can also use the characteristic data for one of those adjacent pixels to determine the correction data for the pixel.

System 100 includes pixel analysis system 102, which can be implemented in hardware, software, or a suitable combination of hardware and software, and which can be one or more hardware systems, or one or more software systems operating on a suitable processing platform. As used herein, a hardware system can be one or more semiconductor devices, an application specific integrated circuit, a field programmable gate array, or other suitable systems or components. A software system can include one or more objects, agents, lines of code, threads, subroutines, databases, application programming interfaces (APIs), or other suitable data structures, source code (human readable), object code (machine readable), and can include two or more different lines of code or suitable data structures operating in two or more separate software applications, on two or more different processing platforms, or in other suitable architectures. In one exemplary embodiment, a software system can include one or more lines of code or other suitable software structures operating in a general purpose software application, such as an operating system, and one or more lines of code or other suitable software structures operating in a specific purpose software application. In another exemplary embodiment, a software system can be implemented as a distributed software system, on a different processing platform than that shown in the exemplary embodiments herein, or in other suitable manners.

Pixel analysis system 102 is coupled to pixel data input and pixel data output. As used herein, the term "couple" and its cognate terms such as "coupled" and "couples" can include a physical connection (such as through a conducting layer of a semiconductor device), a virtual connection (such as through randomly assigned memory locations of a data memory device), a logical connection (such as through one or more logical devices of a semiconducting circuit), other suitable connections, or a suitable combination of such connections. In one exemplary embodiment, systems and components are coupled to other systems and components through intervening systems and components, such as through an operating system of a digital signal processor.

Pixel analysis system 102 includes dynamic range detection system 104, dynamic range correction system 106, minimum characteristic system 108, maximum characteristic system 110, color zone system 112, threshold system 114, pixel testing system 116, non-color zone system 118, min/max correction system 120, and threshold correction system 122, each of which can be implemented in hardware, software, or a suitable combination of hardware and software, and which can be one or more hardware systems or one or more software systems operating on a suitable processing platform.

Dynamic range detection system 104 receives pixel data for a plurality of pixels and determines whether each pixel is "bad," meaning that it has characteristic data that is defined in error. In one exemplary embodiment, a pixel can include an eight-bit characteristic, such as intensity, as well as a color spectral content or other suitable data. Bad pixels can be created by data compression processes, noise introduced during data transmission, or in other manners. Dynamic range detection system 104 determines whether a test pixel is bad based on characteristic data from as few as two adjacent pixels and generates bad pixel flag data.

Dynamic range correction system 106 receives the bad pixel flag data from dynamic range detection system 104 for a test pixel and modifies the test pixel characteristic data to correct the bad pixel. In one exemplary embodiment, dynamic range correction system 106 can select pixel correction data based on the pixel characteristic data from one adjacent pixel.

Minimum characteristic system 108 and maximum characteristic system 110 of dynamic range detection system 104 determine the minimum and maximum pixel characteristic, respectively, for a set of adjacent pixels. In one exemplary embodiment, a set of adjacent pixels can be identified and minimum characteristic system 108 can determine the minimum characteristic value of the set, such as intensity. Likewise, maximum characteristic system 110 can determine the maximum characteristic value. The set of adjacent pixels can be selected by color zone system 112, non-color zone system 118, or other suitable systems. In this exemplary embodiment, color zone system 112 can select a set of adjacent pixels based on the color of the test pixel, on the pixel color distribution pattern type (such as a Bayer pattern), or other suitable data. Likewise, non-color zone system can select a set of adjacent pixels based on the proximity of the adjacent pixels to the test pixel, regardless of color. Other suitable processes can be used to select a set of adjacent pixels from which to select the maximum and minimum characteristic value.

Threshold system 114 can add or subtract a threshold from the minimum and maximum characteristic value determined by minimum characteristic system 108 and maximum characteristic system 110, respectively. In one exemplary embodiment, threshold system 114 can add the same quantity to the maximum characteristic value as is subtracted from the minimum characteristic value. In another exemplary embodiment, threshold system 114 can add a different quantity to the maximum characteristic value from what is subtracted from the minimum characteristic value. In yet another exemplary embodiment, threshold system 114 can add a quantity to the maximum characteristic value and subtract a different quantity from the minimum characteristic value based on user-entered values, values from two or more adjacent pixel zones, or other suitable criteria.

Pixel testing system 116 receives the test pixel data, the minimum characteristic data, and the maximum characteristic data, and determines whether the test pixel data is greater than the maximum characteristic data or less than the minimum characteristic data. In one exemplary embodiment, pixel testing system 116 can use the maximum characteristic data and minimum characteristic data that has been offset by the threshold data generated by threshold system 114. Pixel testing system 116 can then generate test result data that indicates whether the test pixel was within the maximum characteristic data and the minimum characteristic data, was greater than the maximum characteristic data, or less than the minimum characteristic data.

Min/max correction system 120 and threshold correction system 122 receive the test result data and modify the test pixel data depending on the test result data. In one exemplary embodiment, min/max correction system 120 and threshold correction system 122 receive operating mode data, such that min/max correction system 120 is used to generate the modified test pixel data in a first mode and threshold correction system 122 is used to generate the modified test pixel data in a second mode. Min/max correction system 120 decreases the value of the test pixel data to the maximum characteristic data if the value of the test pixel data is greater than the maximum characteristic data. Likewise, min/max correction system 120 increases the value of the test pixel data to the minimum characteristic data if the value of the test pixel data is less than the minimum characteristic data. Threshold correction system 122 decreases the value of the test pixel data to the maximum characteristic data or the maximum characteristic data plus the threshold data if the value of the test pixel data is greater than the maximum characteristic data plus the threshold data. Likewise, threshold correction system 122 increases the value of the test pixel data to the minimum characteristic data or the minimum characteristic data minus the threshold data if the value of the test pixel data is less than the minimum characteristic data minus the threshold data.

In operation, system 100 performs dynamic range bad pixel detection that detects whether a test pixel is a bad pixel based on pixel characteristic data of adjacent pixels, and dynamic range pixel correction that replaces the test pixel with an appropriate adjacent pixel or other suitable data if the test pixel is determined to be a bad pixel. If the pixel characteristic of the test pixel, such as intensity or color spectral content, is greater than the largest characteristic value of an adjacent pixel by more than a predetermined amount, then the test pixel data is replaced with the data for that adjacent pixel. Likewise, if the pixel characteristic of the test pixel is less than the smallest characteristic value of an adjacent pixel by more than a predetermined amount, then the test pixel data is replaced with the data for that adjacent pixel. In this manner, pixels can be analyzed to determine whether they are bad pixels, where the analysis is performed using a small number of operations and in a manner that does not result in a loss of detail.

Figure 2:
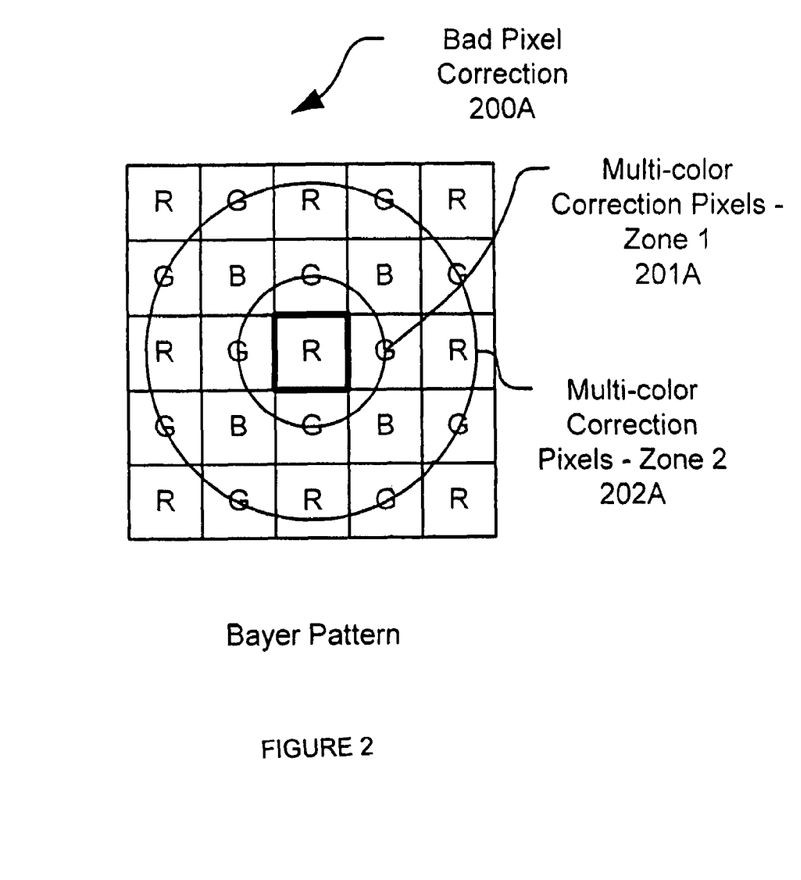
FIG. 2 is a diagram of bad pixel detection and correction zones on a Bayer pattern in accordance with an exemplary embodiment of the present invention.

FIG. 2 is a diagram of bad pixel detection and correction zones 200A on a Bayer pattern in accordance with an exemplary embodiment of the present invention. Bad pixel detection and correction zones 200A include zone 1 201A encompassing the 8 pixels adjacent to the test pixel R, and zone 2 202A encompassing the 16 pixels adjacent to the zone 1 pixels. In one exemplary embodiment, zone 1 201A can be used to select adjacent pixels to analyze color-independent pixel data characteristics, such as intensity, and zone 2 202A can be used to select adjacent pixels to analyze color-dependent characteristics, such as intensity based on color spectral content.

Figure 3:
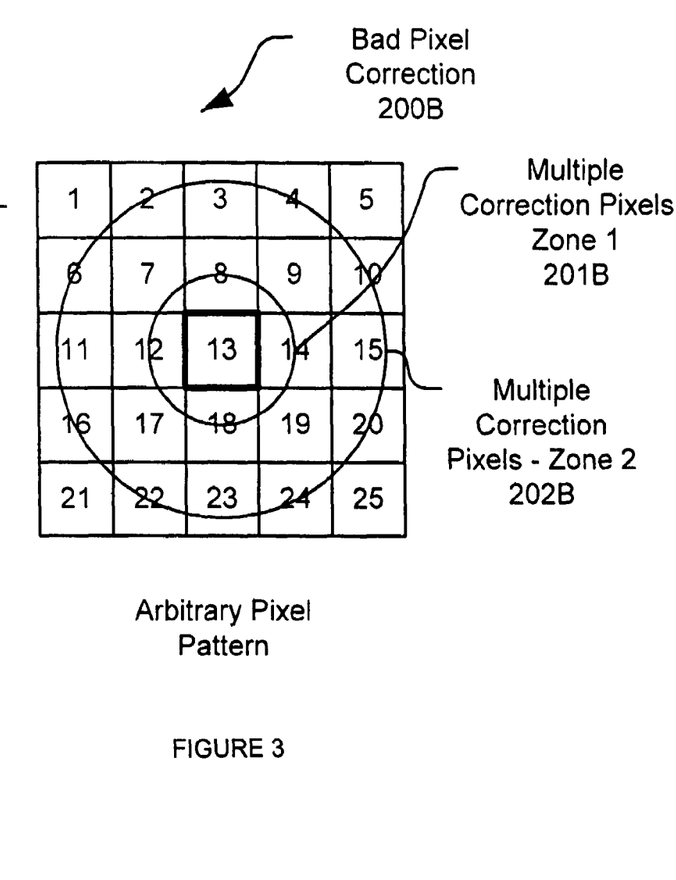
FIG. 3 is a diagram of bad pixel detection and correction zones on an arbitrary pixel pattern in accordance with an exemplary embodiment of the present invention.

FIG. 3 is a diagram of bad pixel detection and correction zones 200B on an arbitrary pixel pattern in accordance with an exemplary embodiment of the present invention. Bad pixel detection and correction zones 200B encompass a test pixel R within an arbitrary pixel pattern shown by a 5×5 array of pixels numbered 1 through 25. Zone 1 201B encompasses the 8 pixels adjacent to the test pixel R, and zone 2 202B encompasses the 16 pixels adjacent to the zone 1 pixels.

Figure 4:
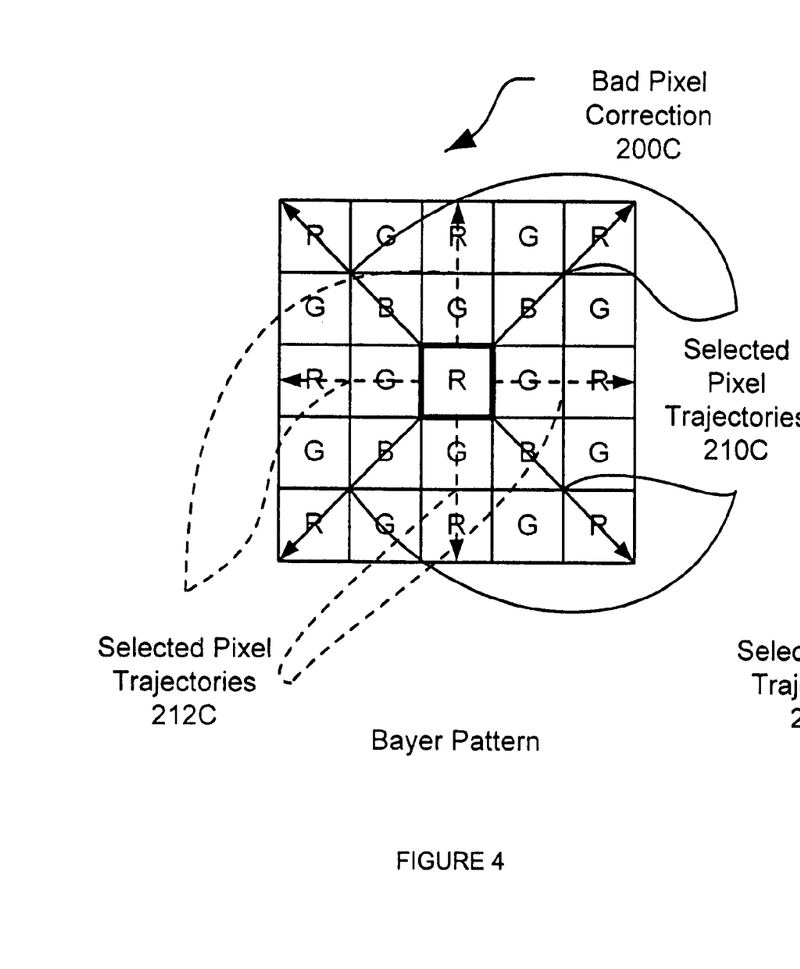
FIG. 4 is a system diagram illustrating another exemplary embodiment of bad pixel detection and correction zones in accordance with the present invention.

FIG. 4 is a system diagram illustrating another exemplary embodiment of bad pixel correction zones 200C in accordance with the present invention. Bad pixel correction zones 200C include pixel trajectories 210C and 212C within a Bayer pattern that are used to select pixels for performing bad pixel detection and correction for a center pixel R.

Figure 5:
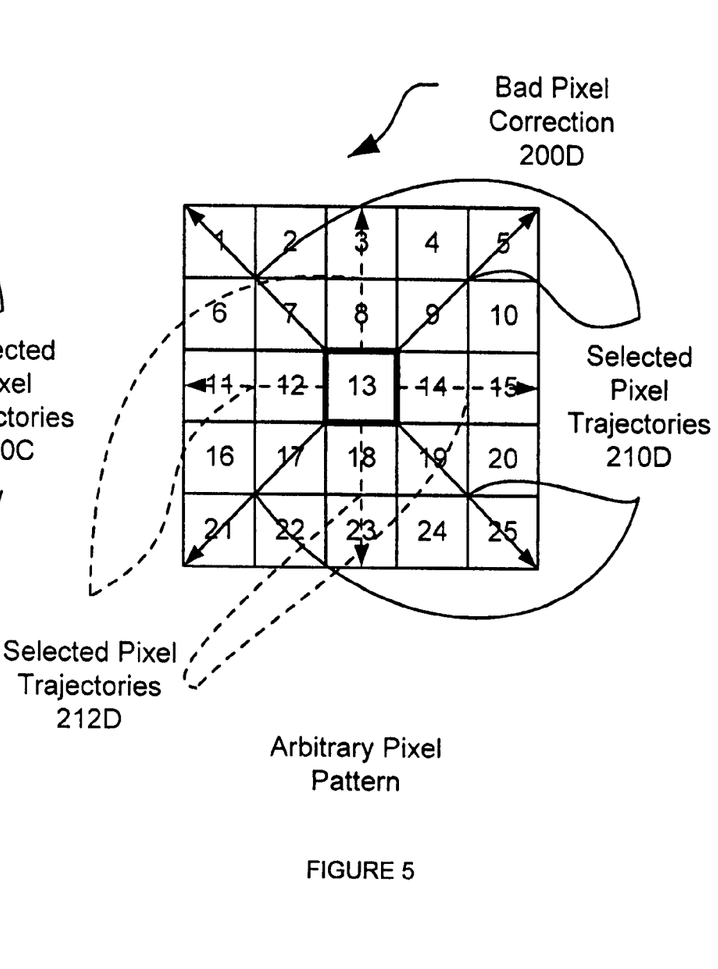
FIG. 5 is a system diagram illustrating another exemplary embodiment of bad pixel detection and correction zones.

FIG. 5 is a system diagram illustrating another exemplary embodiment of bad pixel correction zones 200D. Bad pixel correction zones 200D include pixel trajectories 210D and 212D within an arbitrary pattern that are used to select pixels for performing bad pixel detection and correction for a center pixel R.

Figure 6:
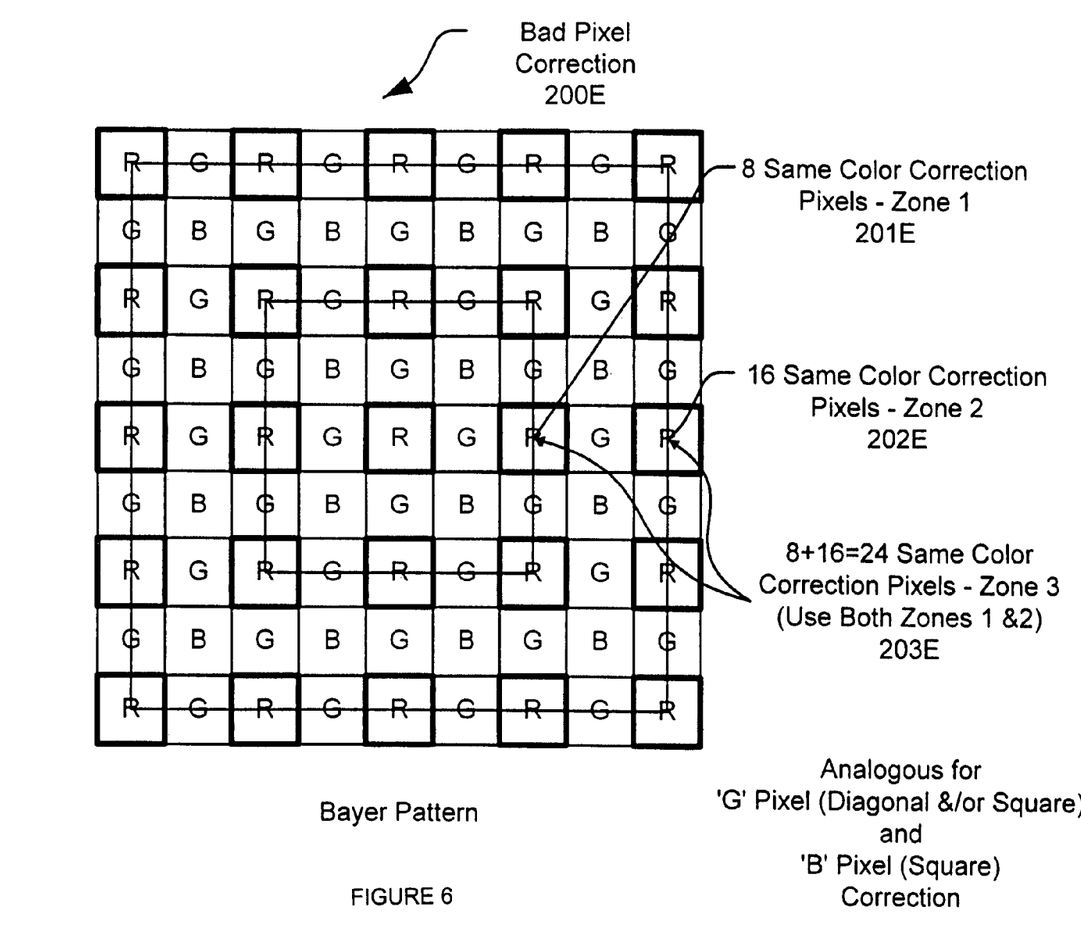
FIG. 6 is a diagram of a bad pixel detection and correction zone in accordance with an exemplary embodiment of the present invention.

FIG. 6 is a diagram of bad pixel correction zone 200E in accordance with an exemplary embodiment of the present invention. Bad pixel correction zone 201E demonstrates adjacent pixel selection for the 8 closest pixels when color-dependent pixel characteristics are being tested for both red and blue pixels, although a red pixel is shown in bad pixel correction zone 200E. Likewise, bad pixel correction zone 3 203E demonstrates adjacent pixel selection for up to the 24 closest pixels when color-dependent pixel characteristics are being tested for both red and blue pixels.

Figure 7:
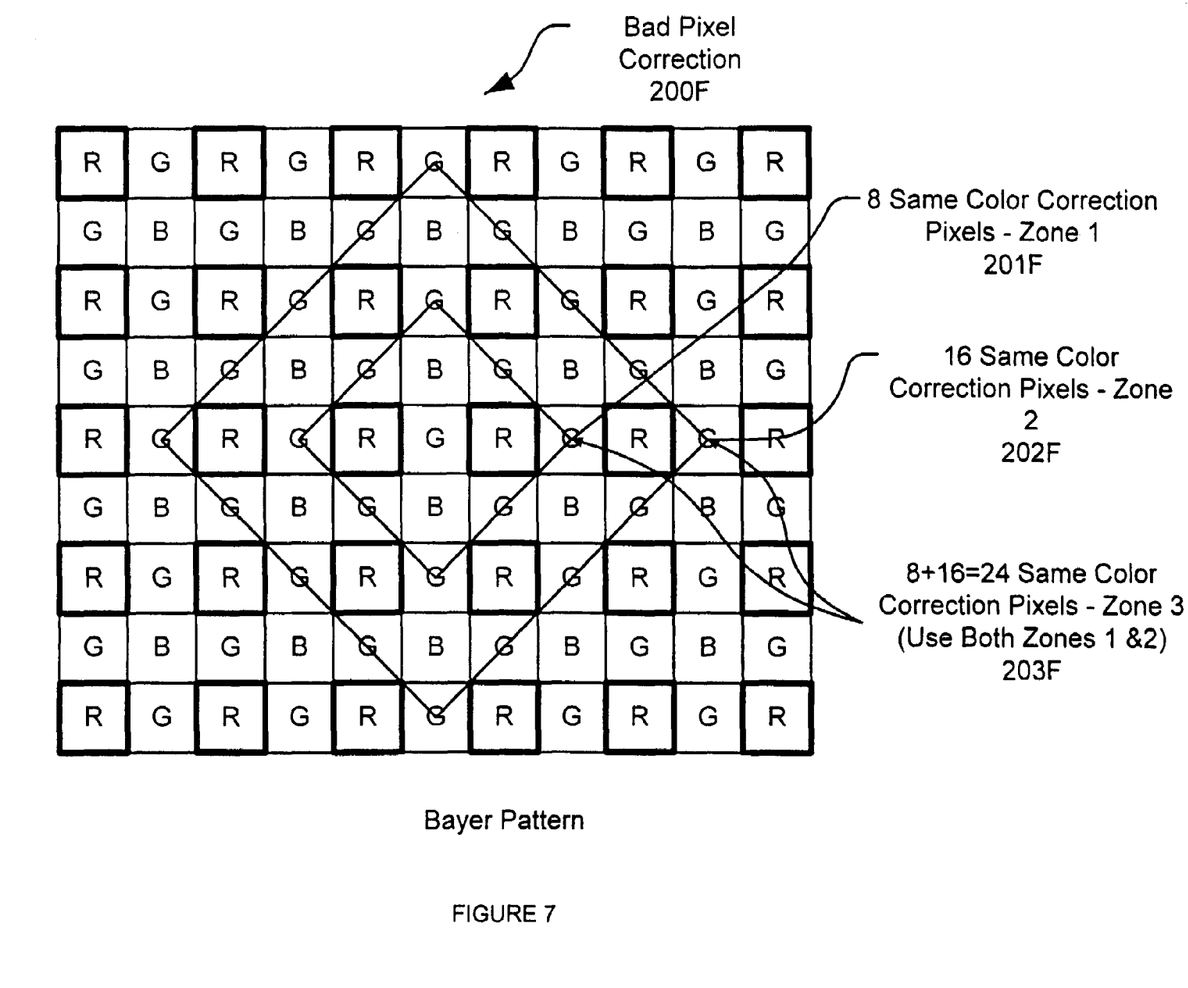
FIG. 7 is a diagram of a bad pixel detection and correction zone in accordance with another exemplary embodiment of the present invention.

FIG. 7 is a diagram of bad pixel correction zone 200F in accordance with an exemplary embodiment of the present invention. Bad pixel correction zone 201F demonstrates adjacent pixel selection for the 8 closest pixels when color-dependent pixel characteristics are being tested for green pixels, which have a different density from that of red and blue pixels in a Bayer pattern. Likewise, bad pixel correction zone 3 203F demonstrates adjacent pixel selection for up to the 24 closest pixels when color-dependent pixel characteristics are being tested for green pixels.

Figure 8:
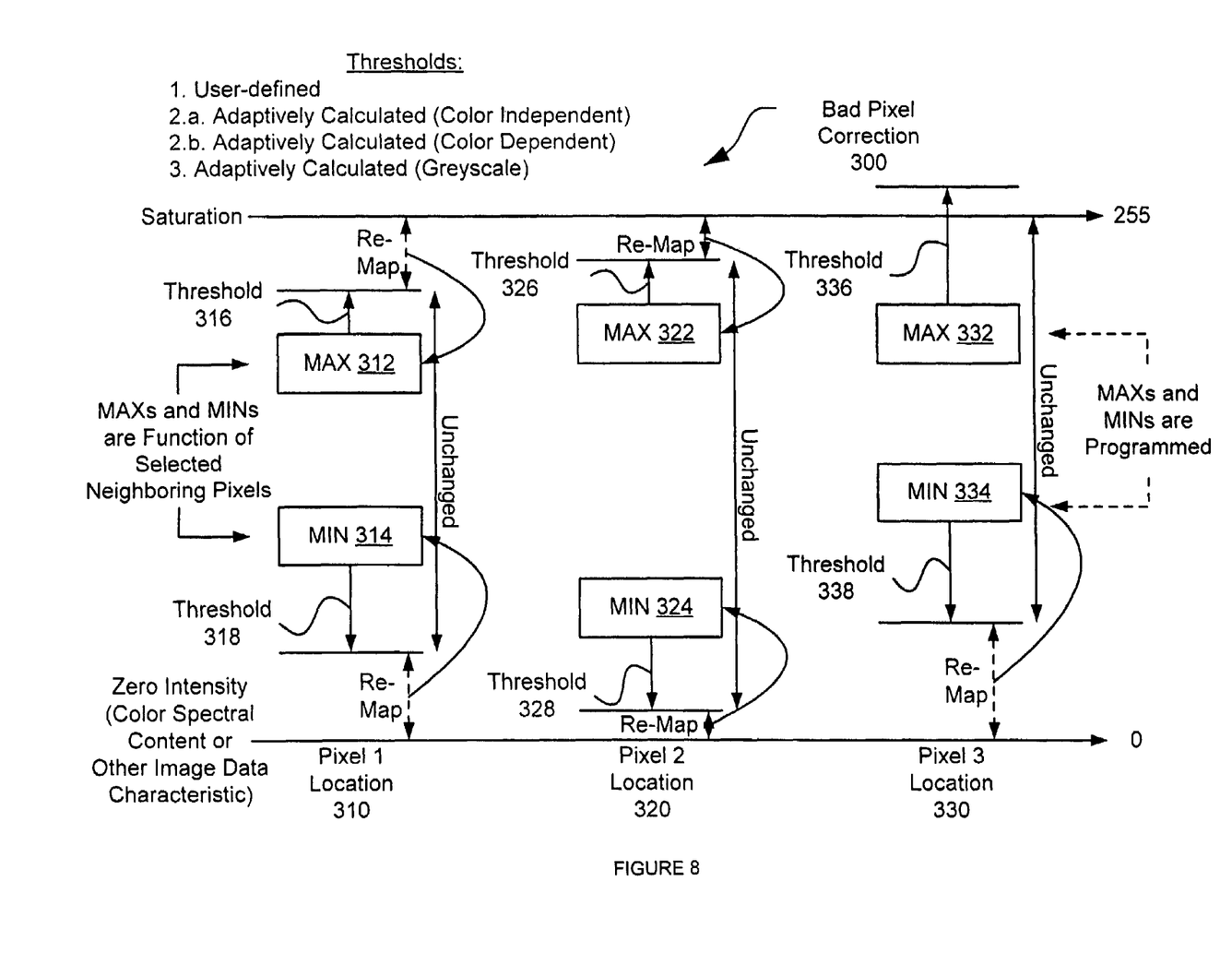
FIG. 8 is a system diagram illustrating a bad pixel detection and correction process in accordance with an exemplary embodiment of the present invention.

FIG. 8 is a system diagram illustrating bad pixel correction process 300 in accordance with an exemplary embodiment of the present invention. Bad pixel correction process 300 determines a maximum value and a minimum value of a pixel characteristic for pixels adjacent to a test pixel, and then determines thresholds based on the maximum value and the minimum value to perform bad pixel detection and correction. In another exemplary embodiment, the maximum value and the minimum value and the corresponding thresholds can be predetermined or otherwise programmed.

Bad pixel correction process 300 includes exemplary pixel 1 location 310, pixel 2 location 320, and pixel 3 location 330. For pixel 1 location 310, maximum 312 with a corresponding threshold 316 and minimum 314 with a corresponding threshold 318 are used to perform re-mapping of the pixel 1 location 310 between a zero intensity level and a saturation level in accordance with the present invention. In this exemplary embodiment, the zero intensity level is shown as having a "0" value, and the saturation level is shown as having a "255" value, such as when an eight bit image data system is used. The difference between the maximum 312 and threshold 316 can be equal to the difference between threshold 318 and minimum 314. Likewise, the difference between the maximum 312 and threshold 316 can be different from the difference between threshold 318 and minimum 314, can be selected based on pixel variability characteristics for surrounding pixels, or can otherwise be adjusted to accommodate for local image data variations. Threshold 316 and threshold 318 can be user-defined, adaptively calculated using different color adjacent pixels for color-independent pixel characteristics, adaptively calculated using same color adjacent pixels for color-dependent pixel characteristics, or other suitable procedures can be used to select or determine threshold 316 and 318.

When the pixel characteristic for pixel 1 location 310 is above the threshold 316 above the maximum 312, then the characteristic value of the pixel 1 location 310 is re-mapped to the maximum 312. In another exemplary embodiment, the characteristic value of the pixel 1 location 310 can be re-mapped to the threshold 316. Similarly, when the pixel characteristic is below the threshold 318 below the minimum 314, then the characteristic value of the pixel 1 location 310 is re-mapped to the minimum 314, or the threshold 318 in another exemplary embodiment.

Pixel 2 location 320 and pixel 3 location 330 demonstrate minimum, maximum, and corresponding threshold values for other exemplary pixels. Maximum 322 and minimum 324 of pixel 2 location 320 are different from maximum 312 and minimum 314 of pixel 1 location, thus demonstrating how the maximum and minimum values can be dynamically assigned based on the values of adjacent pixels. Maximum 332 and minimum 334 of pixel 3 location 330 demonstrate a potential problem that can be encountered, wherein threshold 336 of maximum 332 exceeds the saturation value for a pixel characteristic. In this exemplary embodiment, the threshold 336 is re-assigned to the saturation value. A similar process is implemented when the threshold 338 for the minimum 334 is less than the zero characteristic value.

Figure 9:
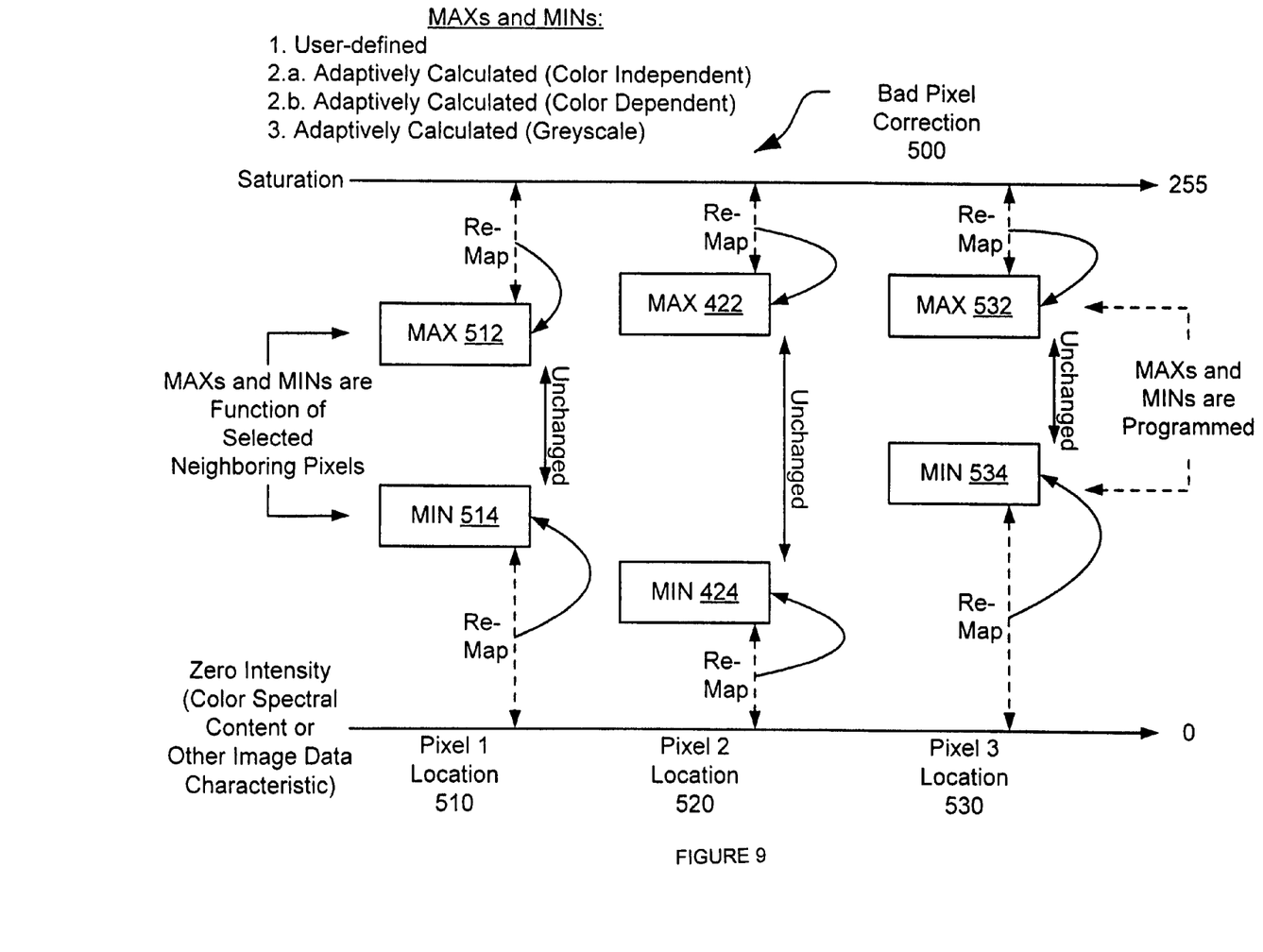
FIG. 9 is a system diagram illustrating a bad pixel detection and correction process in accordance with another exemplary embodiment of the present invention.

FIG. 9 is a system diagram illustrating bad pixel correction process 500 in accordance with an exemplary embodiment of the present invention. Bad pixel correction process 300 determines a maximum value and a minimum value of a pixel characteristic for pixels adjacent to a test pixel, and but does not assign thresholds. Thus, bad pixel correction process 500 can be used when a threshold is not used to detect and correct bad pixels.

Figure 10:
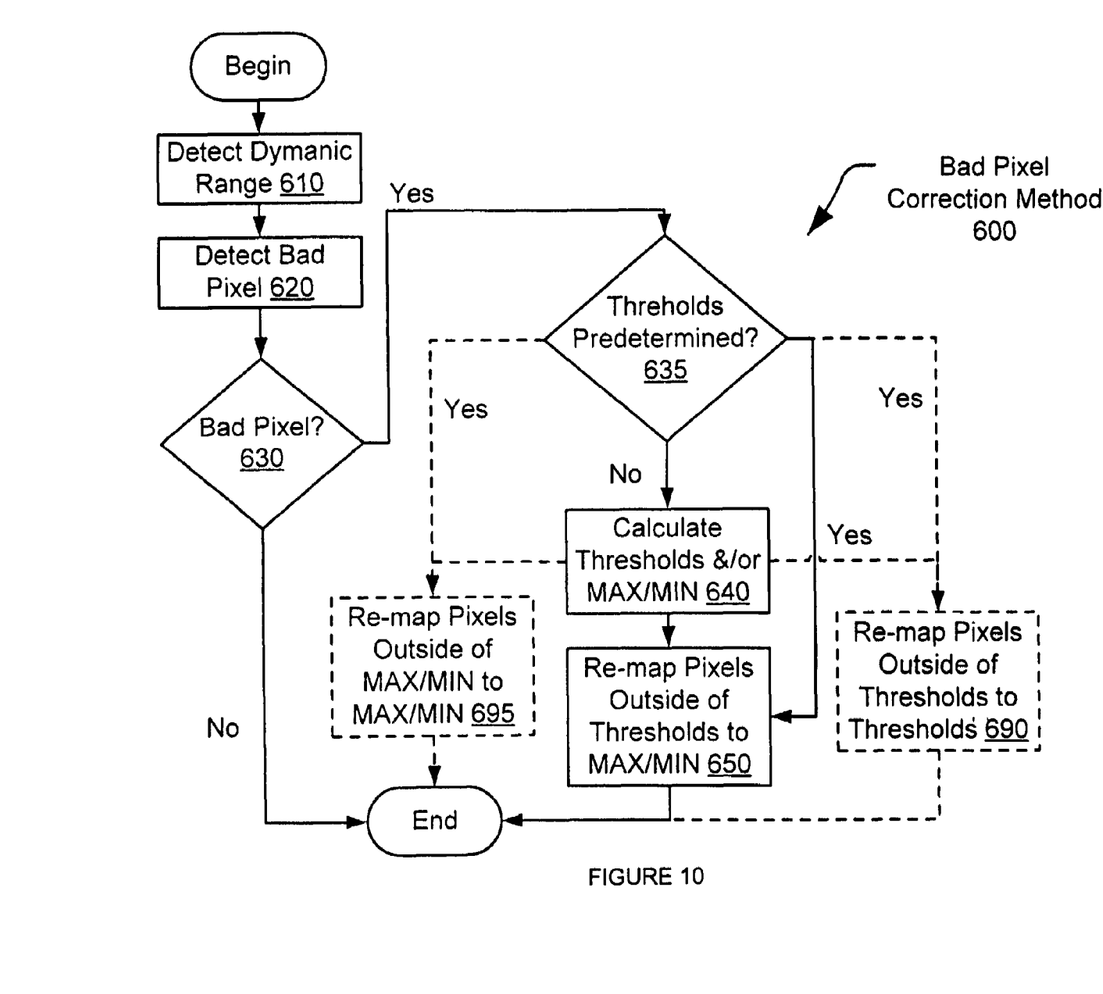
FIG. 10 is a flowchart of a bad pixel detection and correction method in accordance with an exemplary embodiment of the present invention.

FIG. 10 is a flowchart of a bad pixel correction method 600 in accordance with an exemplary embodiment of the present invention. Method 600 begins at 610, where a dynamic range for a test pixel is detected. In one exemplary embodiment, the range can be detected using the maximum and minimum values of a pixel characteristic for a set of adjacent pixels. The method then proceeds to 620.

At 620, the test pixel is compared to the dynamic range. In one exemplary embodiment, the characteristic for the test pixel can be compared to the maximum and minimum characteristic values for adjacent pixels, to maximum and minimum characteristic values for adjacent pixels that have been offset by a threshold amount, or other suitable values. The method then proceeds to 630, where it is determined whether the test pixel is a bad pixel. If it is determined that the test pixel is not a bad pixel, then the method terminates for that pixel, and the next test pixel can be processed. If it is determined at 630 that the test pixel is a bad pixel, then the method proceeds to 635.

At 635, it is determined whether different thresholds or minimum/maximum values are used to perform bad pixel correction as compared to those that are used to perform bad pixel detection. If the thresholds or minimum/maximum values are not different, the method either proceeds to 690, where the pixels are remapped to the threshold values, or to 695, where the pixels are remapped to the corresponding maximum or minimum value. In one exemplary embodiment, if a pixel has a characteristic that is less than the minimum value for that characteristic or the minimum value minus a threshold, it is mapped to the minimum value or the minimum value minus the threshold. Likewise, if a pixel has a characteristic that is greater than the maximum value for that characteristic or the maximum value plus a threshold, it is mapped to the maximum value or the maximum value plus the threshold.

If it is determined at 635 that the thresholds are different, then the method proceeds to 640 where new thresholds or minimum/maximum values are calculated. The method then proceeds to 650 where the pixel is mapped to the new threshold or minimum/maximum value.

In operation, bad pixel correction method 600 provides for the detection and correction of bad pixels based on dynamic range thresholds. Method 600 thus allows bad pixel correction to be performed using less processing resources than other methods, and avoids the inadvertent elimination of detail that can be encountered using prior art methods by assigning threshold values at a level that does not remove detail.

Figure 11:
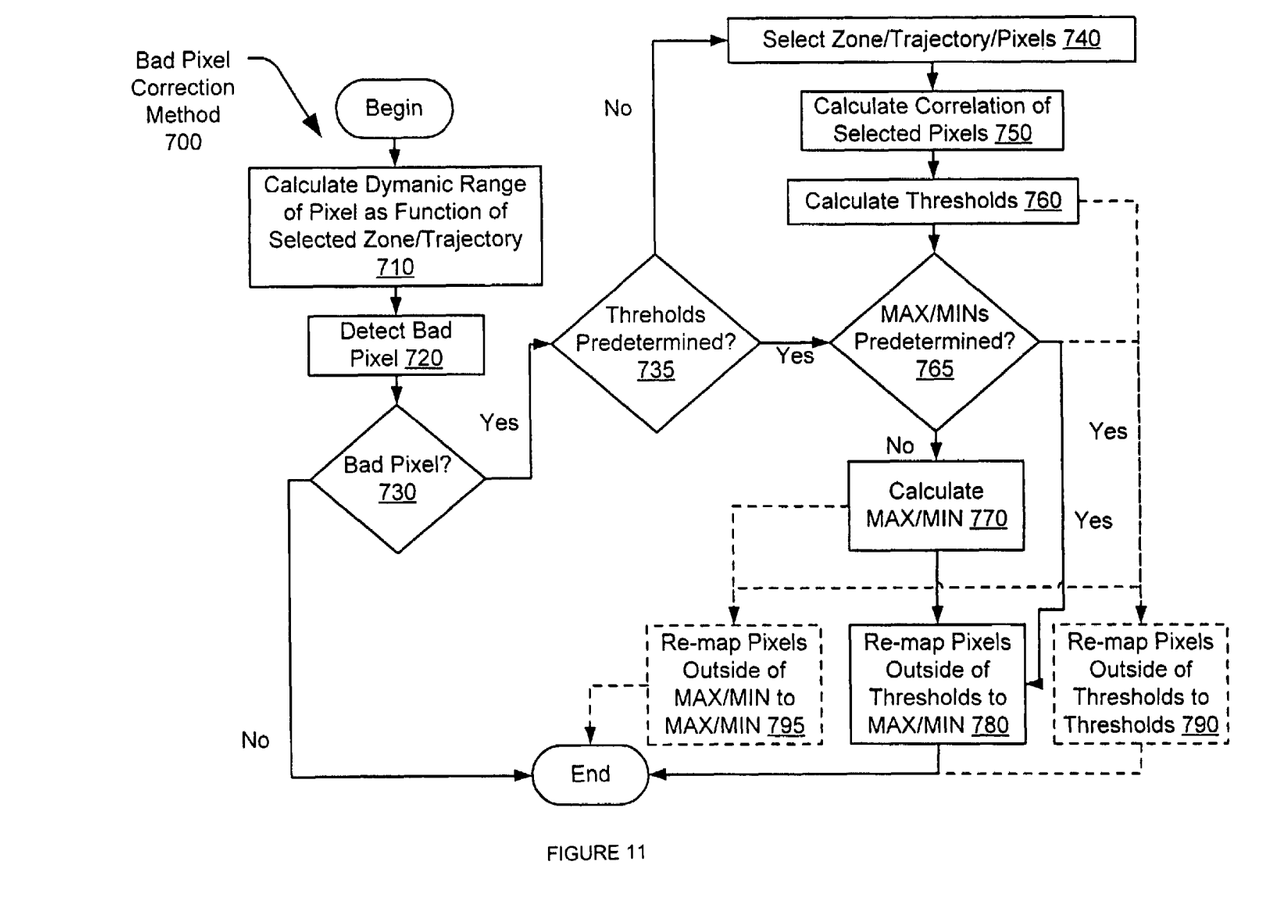
FIG. 11 is a flowchart of a bad pixel detection and correction method with trajectory selection in accordance with an exemplary embodiment of the present invention.

FIG. 11 is a flowchart of a bad pixel correction method 700 with trajectory selection in accordance with an exemplary embodiment of the present invention. Method 700 begins at 710 where a dynamic range of a pixel characteristic for a test pixel is calculated as a function of pixel characteristic data for pixels in a selected zone or trajectory. The method then proceeds to 720, where the test pixel is analyzed to determine whether it is a bad pixel, such as by comparing the pixel characteristic to a maximum and minimum value to determine whether it is greater than the maximum or less than the minimum. The method then proceeds to 730 where it is determined whether the test pixel is a bad pixel. If it is determined that the test pixel is not a bad pixel, the method terminates for the current pixel, and another pixel can be analyzed.

If it is determined that the test pixel is a bad pixel, then the method proceeds to 735 where it is determined whether any thresholds used to perform bad pixel correction are predetermined or not. If the thresholds are not predetermined the method proceeds to 740 where a selection is made of the zone, the trajectory, and/or the pixels that are to be used to perform the necessary calculations to determine the thresholds. The method then proceeds to 750 where the correlation of the selected pixels is calculated. The method then proceeds to 760 where the thresholds are then calculated. The method then proceeds to 765 where it is determined whether the maximums and minimums are predetermined.

In one exemplary embodiment, the method proceeds from 760 to 790 where the new thresholds are re-mapped to the old thresholds. In yet another exemplary embodiment, the pixels outside of the maximums and minimums are re-mapped to the maximums and minimums as shown in 795.

If it is determined at 735 that the thresholds are predetermined, then the method proceeds to 765 where it is determined whether the maximums and minimums are predetermined. If the maximums and minimums are predetermined, then the method proceeds to 780 and the pixels outside of the thresholds are re-mapped to the maximums and minimums. If the maximums and minimums are not predetermined, then the method proceeds to 770 where the maximums and minimums are calculated. The pixels outside of the thresholds are then re-mapped to the maximums and minimums as shown in 780, or the pixels outside of the maximums and minimums are mapped to the maximums and minimums as shown in 795.

While various embodiments of the invention have been described, it will be apparent to those of ordinary skill in the art that many more embodiments and implementations are possible that are within the scope of this invention.

What is claimed is:

1. A pixel correction system, comprising:
    a dynamic range detection system receiving test pixel data and adjacent pixel data and determining whether the test pixel data is within minimum pixel characteristic data and maximum pixel characteristic data of the adjacent pixel data; and
    a dynamic range correction system coupled to the dynamic range detection system, the dynamic range correction system adjusting the test pixel data if the test pixel data is not within the maximum pixel characteristic data and the minimum pixel characteristic data;
    wherein the dynamic range correction system further comprises a min/max correction system adjusting the test pixel data to equal the minimum characteristic data if the test pixel data is less than the minimum characteristic data and adjusting the test pixel data to equal the maximum characteristic data if the test pixel data is greater than the maximum characteristic data.

2. A pixel correction system, comprising:
a dynamic range detection system receiving test pixel data and adjacent pixel data and determining whether the test pixel data is within minimum pixel characteristic data and maximum pixel characteristic data of the adjacent pixel data; and
a dynamic range correction system coupled to the dynamic range detection system, the dynamic range correction system adjusting the test pixel data if the test pixel data is not within the maximum pixel characteristic data and the minimum pixel characteristic data;
wherein the dynamic range correction system further comprises a threshold correction system adjusting the test pixel data to equal the minimum characteristic data minus a minimum threshold value if the test pixel data is less than the minimum characteristic data and adjusting the test pixel data to equal the maximum characteristic data plus a maximum threshold value if the test pixel data is greater than the maximum characteristic data.

3. The system of claim 2, wherein the dynamic range detection system further comprises a minimum characteristic system determining the minimum pixel characteristic data from the adjacent pixel data.

4. The system of claim 2, wherein the dynamic range detection system further comprises a maximum characteristic system determining the maximum pixel characteristic data from the adjacent pixel data.

5. The system of claim 2, wherein the dynamic range correction system further comprises a color zone system generating the adjacent pixel data based on test pixel color data.

6. The system of claim 2, wherein the dynamic range correction system further comprises a non-color zone system generating the adjacent pixel data without regard to test pixel color data.

7. The system of claim 2, wherein the dynamic range detection system further comprises a pixel testing system comparing the test pixel data to the minimum characteristic data and the maximum characteristic data and generating test result data that identifies whether the test pixel data is less than the minimum pixel characteristic data or greater than the maximum pixel characteristic data.

8. A method for correcting pixels comprising:
selecting two or more adjacent pixels to a test pixel, where each of the adjacent pixels and the test pixel have associated characteristic data;
determining a maximum characteristic value of the characteristic data of the adjacent pixels;
determining a minimum characteristic value of the characteristic data of the adjacent pixels;
correcting the test pixel characteristic data if it is less than the minimum characteristic data or greater than the maximum characteristic data, wherein said correcting comprises adjusting the test pixel characteristic data to equal the minimum characteristic value if the test pixel characteristic data is less than the minimum characteristic data and adjusting the test pixel characteristic data to equal the maximum characteristic data if the test pixel characteristic data is greater than the maximum characteristic data.

9. The method of claim 8 wherein determining the maximum characteristic value of the characteristic data of the adjacent pixels comprises determining the maximum characteristic value of each of the adjacent pixels.

10. The method of claim 8 wherein determining the maximum characteristic value of the characteristic data of the adjacent pixels comprises determining the maximum characteristic value of each of the adjacent pixels and adding a threshold value.

11. The method of claim 8 wherein determining the minimum characteristic value of the characteristic data of the adjacent pixels comprises determining the minimum characteristic value of each of the adjacent pixels.

12. The method of claim 8 wherein determining the minimum characteristic value of the characteristic data of the adjacent pixels comprises determining the minimum characteristic value of each of the adjacent pixels and subtracting a threshold value.

13. A system for detecting a bad pixel comprising:
a minimum characteristic system determining minimum characteristic data for a plurality of adjacent pixels;
a maximum characteristic system determining maximum characteristic data for the plurality of adjacent pixels; and
a pixel testing system receiving test pixel data, the minimum characteristic data and the maximum characteristic data and generating test result data as a function of whether the test pixel data is less than the minimum characteristic data or greater than the maximum characteristic data, wherein the generating comprises adjusting the test pixel data to equal the minimum characteristic data if the test pixel data is less than the minimum characteristic data and adjusting the test pixel data to equal the maximum characteristic data if the test pixel data is greater than the maximum characteristic data.

14. The system of claim 13 further comprising a zone system receiving the test pixel data and selecting the set of adjacent pixels.

15. A system for detecting a bad pixel comprising:
a minimum characteristic system determining minimum characteristic data for a plurality of adjacent pixels;
a maximum characteristic system determining maximum characteristic data for the plurality of adjacent pixels; and
a pixel testing system receiving test pixel data, the minimum characteristic data and the maximum characteristic data and generating test result data as a function of whether the test pixel data is less than the minimum characteristic data or greater than the maximum characteristic data; and
a green zone system receiving the test pixel data and selecting the set of adjacent pixels based on a green pixel distribution of a Bayer pattern.

16. A system for detecting a bad pixel comprising:
a minimum characteristic system determining minimum characteristic data for a plurality of adjacent pixels;
a maximum characteristic system determining maximum characteristic data for the plurality of adjacent pixels; and
a pixel testing system receiving test pixel data, the minimum characteristic data and the maximum characteristic data and generating test result data as a function of whether the test pixel data is less than the minimum characteristic data or greater than the maximum characteristic data; and
a red zone system receiving the test pixel data and selecting the set of adjacent pixels based on a red pixel distribution of a Bayer pattern.

17. A method, comprising:

selecting two or more adjacent pixels to a test pixel, where each of the adjacent pixels and the test pixel have associated characteristic data;

determining a maximum characteristic value of the characteristic data of the adjacent pixels;

determining a minimum characteristic value of the characteristic data of the adjacent pixels;

correcting the test pixel characteristic data if it is less than the minimum characteristic data or greater than the maximum characteristic data, wherein the correcting comprises adjusting the test pixel characteristic data to equal the minimum characteristic data minus a minimum threshold value if the test pixel characteristic data is less than the minimum characteristic data and adjusting the text pixel characteristic data to equal the maximum characteristic data plus a maximum threshold value if the test pixel characteristic data is greater than the maximum characteristic data.

18. A system, comprising:

means for selecting two or more adjacent pixels to a test pixel, where each of the adjacent pixels and the test pixel have associated characteristic data;

means for determining a maximum characteristic value of the characteristic data of the adjacent pixels;

means for determining a minimum characteristic value of the characteristic data of the adjacent pixels;

means for correcting the test pixel characteristic data if it is less than the minimum characteristic data or greater than the maximum characteristic data, wherein the correcting comprises adjusting the test pixel characteristic data to equal the minimum characteristic data minus a minimum threshold value if the test pixel characteristic data is less than the minimum characteristic data and adjusting the text pixel characteristic data to equal the maximum characteristic data plus a maximum threshold value if the test pixel characteristic data is greater than the maximum characteristic data.

19. A system, comprising:

means for selecting two or more adjacent pixels to a test pixel, where each of the adjacent pixels and the test pixel have associated characteristic data;

means for determining a maximum characteristic value of the characteristic data of the adjacent pixels;

means for determining a minimum characteristic value of the characteristic data of the adjacent pixels;

means for correcting the test pixel characteristic data if it is less than the minimum characteristic data or greater than the maximum characteristic data, wherein said correcting comprises adjusting the test pixel characteristic data to equal the minimum characteristic value if the test pixel characteristic data is less than the minimum characteristic data and adjusting the test pixel characteristic data to equal the maximum characteristic data if the test pixel characteristic data is greater than the maximum characteristic data.

20. A system, comprising:

a minimum characteristic system determining minimum characteristic data for a plurality of adjacent pixels;

a maximum characteristic system determining maximum characteristic data for the plurality of adjacent pixels; and a pixel testing system receiving test pixel data, the minimum characteristic data and the maximum characteristic data and generating test result data as a function of whether the test pixel data is less than the minimum characteristic data or greater than the maximum characteristic data, wherein the generating comprises adjusting the test pixel data to equal the minimum characteristic data minus a minimum threshold value if the test pixel data is less than the minimum characteristic data and adjusting the text pixel data to equal the maximum characteristic data plus a maximum threshold value if the test pixel data is greater than the maximum characteristic data.

* * * * *